H. C. Kellogg.
Seeder and Cultivator.
N° 86,019. Patented Jan. 19, 1869.
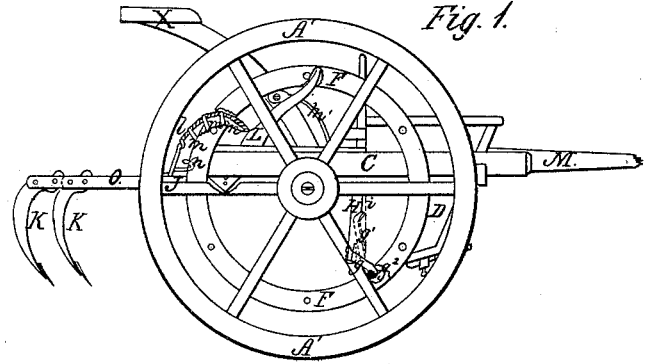
Fig. 1.
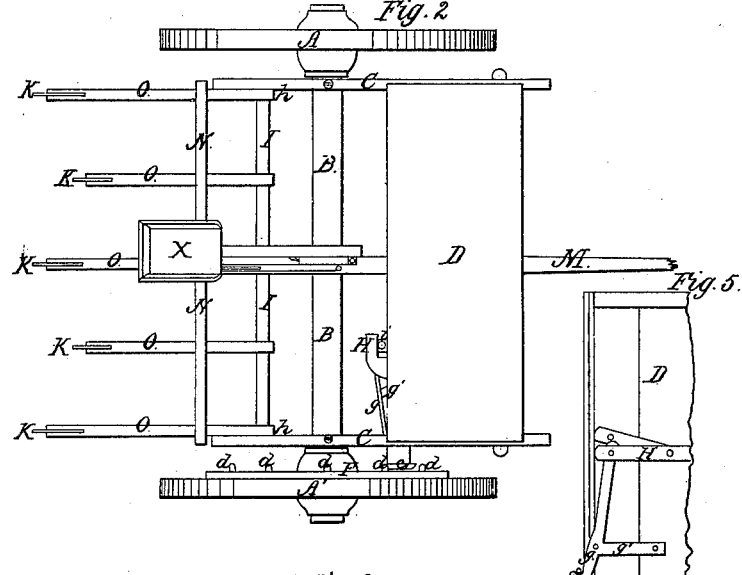
Fig. 2.
Fig. 5.
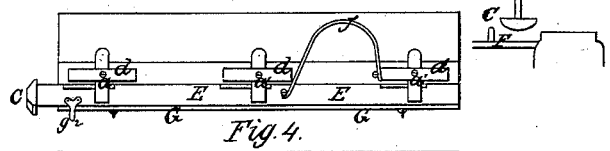
Fig. 3.
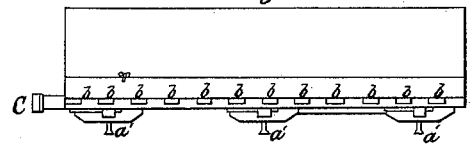
Fig. 4.
Witnesses,
John A. Ellis
S. W. Baxter
Inventor:
H. C. Kellogg
Per
S. H. Alexander
Atty

UNITED STATES PATENT OFFICE.

H. C. KELLOGG, OF QUASQUETON, IOWA.

IMPROVEMENT IN COMBINED SOWER AND CULTIVATOR.

Specification forming part of Letters Patent No. 86,019, dated January 19, 1869; antedated December 22, 1868.

*To all whom it may concern:*

Be it known that I, H. C. KELLOGG, of Quasqueton, in the county of Buchanan and State of Iowa, have invented certain new and useful Improvements in Sowing and Cultivating Grain; and I do hereby declare that the following is a full, clear, and exact description thereof, reference being had to the accompanying drawings, and to the letters of reference marked thereon, which form a part of this specification, and in which—

Figure 1 represents a side view, Fig. 2 a plan view, Fig. 3 an inverted view, and Fig. 4 a rear view, of the seed-box, showing the seed-cells of my combined seeder and cultivator.

Similar letters indicate like parts in each figure.

My invention relates to certain improvements in a combined seeder and cultivator, the peculiarities of which will hereinafter be fully set forth.

In the accompanying drawing, A′ A represent the wheels, and B the axle-tree, to the upper side of which is secured the frame C, to the front end of which is attached the seed box or hopper D, which is made with an opening in its bottom and provided with the distributer-bar E, which has seed-cells $b\ b\ b$ formed on its rear edge. The distributer-bar is attached to the bottom of the hopper by brackets $a\ a$, which are adjusted by thumb-screws $a'\ a'\ a'$, as seen in Fig. 3.

The distributer-bar is made longer than the hopper, with a knob, $c$, on the end, projecting beyond the hopper, which works into the pins or cogs $d\ d\ d$ on a wheel-like device, F, which is secured to the wheel A′, so that when the machine is in operation the cogs or pins $d\ d\ d$, acting upon the knob $c$, throw the distributer-bar in, and the spring $f$, which is secured to the under side of the hopper, as seen in Fig. 3, throws the distributer back, thus giving a vibratory motion to the distributer-bar E, and causing a uniform distribution of grain.

The slide G is attached to the rear side of the hopper, over the seed-cells $b\ b\ b$. To a bar, $i$, on this slide is pivoted the lever H, which is slotted at its lower end, and in which is pivoted a metal plate or hook, $g$. This hook is pivoted at its center to the lower end of a metal bar, $g^1$, which is secured at right angles to the seed-box, the outer end of said hook being made to clasp on or engage with a metal projection, $g^2$, on the distributer-bar E.

By means of the above arrangement the slide G can be slid back and forth, covering and uncovering the seed-cells $b\ b\ b$, thus allowing the seed to be cut off or escape when desired; and also, by this arrangement the distributer-bar can be thrown in or out of action.

O O, the cultivator-bars, are pivoted to the bar I, which works into metal pendants $h$ attached to the outer rear end of the frame C. K K, the cultivator-teeth, are secured to the ends of the bars O O.

The bar J is secured to the under side of the cultivator-bars, and is connected with lever L by a cord, $l$.

The lever L is pivoted in a slot made or cut in the rear end of the tongue M, and is formed, at it lower or pivoted end, with a semicircular shoulder, on which are secured toothed projections $m$, over which cord $l$ passes.

$m'$ is a serrated metal strap, fastened at one end to the bar on which the driver's seat X is situated and fastened at its lower end to the tongue M, and is designed to hold the lever L in its place when the cultivator-teeth are elevated.

N is a bar fastened laterally on the cultivator-bars, and provided with metal strips $n$, bent so as to form suitable receptacles for the feet of the driver, which are designed to rest thereon, in order to press the cultivator-teeth into the ground.

I do not claim operating the distributer of a seeding-machine by means of pins or a cam on the driving-wheel operating the distributer, in combination with a spring; but,

Having thus fully described my invention, what I claim as new, and desire to secure by Letters Patent, is—

The seed-distributer E, seed-box D, projection $g^2$, and knob C, in combination with the brackets $a\ a\ a$, thumb-screws $a'\ a'\ a'$, wheel-like device F, cogs $d\ d$, slide G, lever H, and hook $g$, all operating substantially as and for the purpose set forth.

In testimony that I claim the above as my own I herewith affix my signature in the presence of two witnesses.

H. C. KELLOGG.

Witnesses:
C. H. LEWIS,
Z. P. FREEMAN.